United States Patent [19]
Martin

[11] Patent Number: 5,691,628
[45] Date of Patent: Nov. 25, 1997

[54] REGULATION OF CURRENT OR VOLTAGE WITH PWM CONTROLLER

[75] Inventor: Joseph A. Martin, Grove City, Ohio

[73] Assignee: Rochester Instrument Systems, Inc., Rochester, N.Y.

[21] Appl. No.: 407,772

[22] Filed: Mar. 21, 1995

[51] Int. Cl.⁶ .................. G05F 1/40; G05F 1/455
[52] U.S. Cl. .................. 323/237; 323/242
[58] Field of Search .................. 323/242, 243, 323/318, 320, 325, 326, 237, 246; 363/21

[56] References Cited

U.S. PATENT DOCUMENTS

| | | | |
|---|---|---|---|
| 3,210,647 | 10/1965 | Dyke | 323/22 |
| 3,226,630 | 12/1965 | Lampke | 323/22 |
| 3,794,917 | 2/1974 | Martin et al. | 324/142 |
| 3,863,140 | 1/1975 | Easter et al. | 323/17 |
| 3,976,942 | 8/1976 | Mayfield | 324/142 |
| 4,321,662 | 3/1982 | Yokoyama | 363/86 |
| 4,488,106 | 12/1984 | Chernotsky et al. | 323/239 |
| 4,688,161 | 8/1987 | Covington | 363/37 |
| 4,689,548 | 8/1987 | Mechlenburg | 323/243 |
| 4,825,347 | 4/1989 | Guerrera et al. | 363/41 |
| 4,866,588 | 9/1989 | Rene | 363/21 |
| 4,885,674 | 12/1989 | Varga et al. | 363/21 |
| 4,928,054 | 5/1990 | Martin-Lopez | 323/288 |
| 4,968,927 | 11/1990 | Pelonis | 323/243 |
| 5,164,872 | 11/1992 | Howell | 361/3 |
| 5,329,223 | 7/1994 | Riggio | 323/246 |

OTHER PUBLICATIONS

Spec sheet for Unitrode Current Mode PWM Controller, pp. 5–186 to 5–191, dated Jun. 1993.

*Primary Examiner*—Peter S. Wong
*Assistant Examiner*—Bao Q. Vu
*Attorney, Agent, or Firm*—Rudnick & Wolfe

[57] ABSTRACT

A circuit for providing a periodic output having a regulated magnitude is derived from a periodic input source. A switch is serially connected to the input for periodically sampling the input at a sampling frequency which is much higher than the frequency of the periodic input, while the duty ratio of the sampling is modulated as an inverse function of the output magnitude. The pulse train of samples is filtered to remove the sampling frequency and its harmonics and the result is a regulated output which replicates the input waveform.

28 Claims, 9 Drawing Sheets

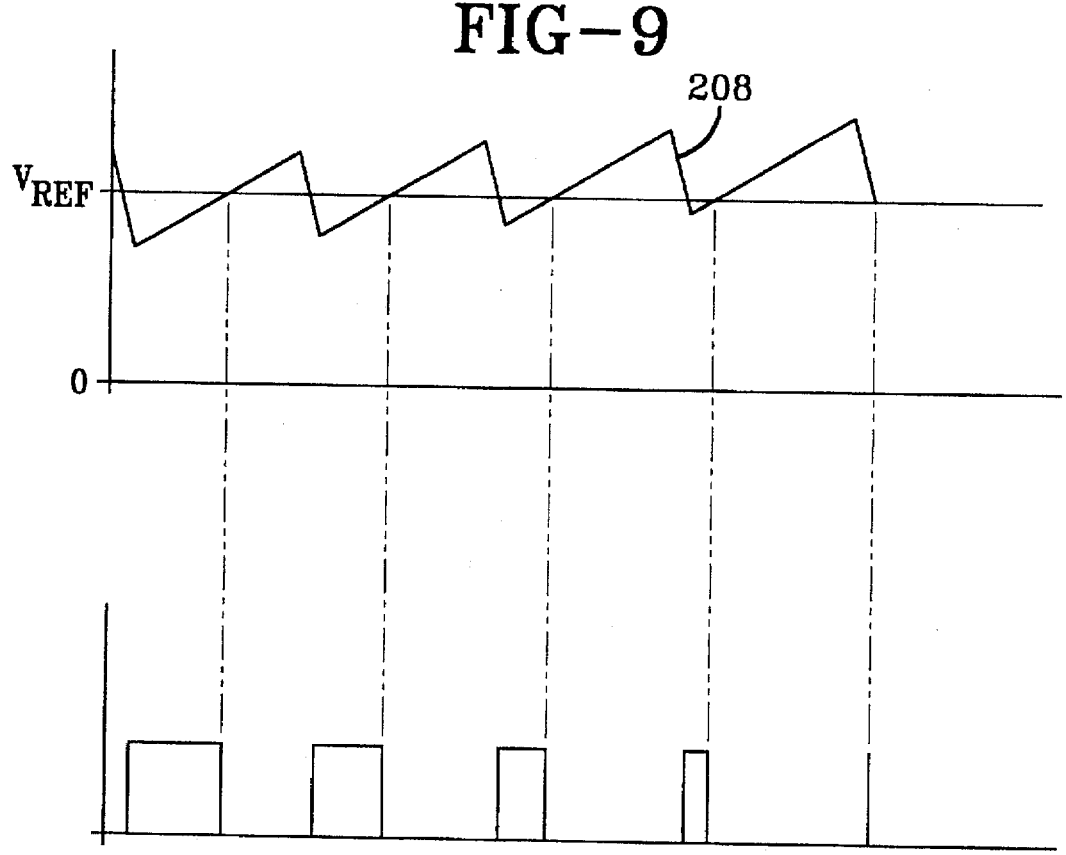
FIG-9
FIG-10
FIG-11
| FIG-11A | FIG-11D |
| --- | --- |
| FIG-11B | FIG-11C |
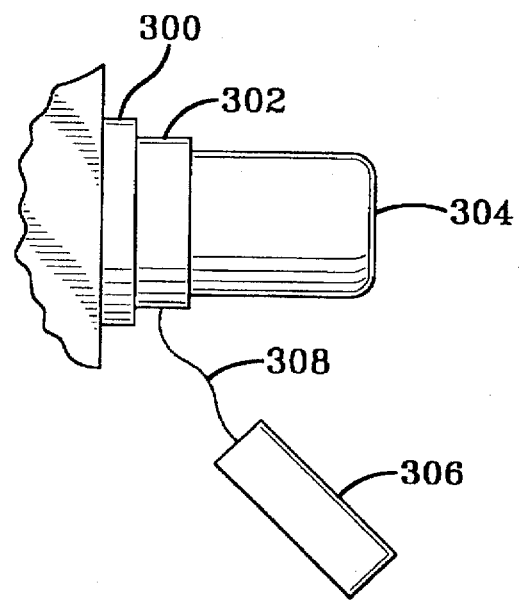
FIG-12

REGULATION OF CURRENT OR VOLTAGE WITH PWM CONTROLLER

TECHNICAL FIELD

This invention relates generally to electrical circuitry and methods for regulating the magnitude of periodic electrical signals used in electrical power systems or other electronic equipment, and more particularly relates to obtaining from an input source, such as the line voltage from a power company, a precision, highly regulated output current or voltage while accurately replicating the input waveform or, optionally for a sinusoidal input, removing harmonic distortion.

BACKGROUND ART

A highly regulated current or voltage source is commonly needed in many diverse circuit applications. These include use in a meter verifier as an accurate source for testing the accuracy of meters which measure the quantity of power consumption by a utility customer.

In the past, thyratrons, silicon controlled rectifiers and triacs have been used for regulator circuits as well as for dimmers and motor speed controllers. They operate by controlling the firing angle at which the switching device begins conduction, with conduction terminating at the end of a half cycle where the instantaneous voltage across the device becomes zero. While such circuits are effective for maintaining a well regulated RMS or DC voltage or current, they introduce severe waveform distortion, therefore introducing substantial harmonic content so that the resulting output waveform is substantially different from the input waveform. Since the harmonics exist at frequencies which are integral multiples of the fundamental, the resulting output includes harmonics near the fundamental frequency making filtering difficult and inefficient.

A meter verifier has an adapter with connector hardware so that, after the meter has been removed, the male connector of the adapter is inserted into the female meter connector and the meter is then installed in another female connector formed on the adapter. Both a meter verifier standard and the meter under test measure the same voltage or current or both. This permits the parameters detected by both the meter and the standard to be compared. Consequently, a meter verifier must provide well regulated source of test current or voltage or both to the meter being tested and to the standard.

With a prior art meter verifier, an operator installs the verifier adapter and the meter, initiates a test sequence, counts a standard number of rotations of the disk of a rotating meter, and then actuates a switch to terminate the test. Since each rotation of the disk represents a known quantity of power, the verifier can then display the percent registration or percent error of the meter.

Test currents in prior art meter verifiers were derived with limiting resistors connected in series with the primary winding of a current transformer. The resistance of such resistors is subject to drift and variation resulting from heating and aging of the circuit components and they control the current only in a passive manner in accordance with ohm's law.

Current meter verifier specifications require the capability of supplying test currents at each of a plurality of full load currents, such as 15, 30, and 50 amperes, and in addition the capability of providing light load currents at ten percent of each of those values. Utilizing prior art technology, as described above, required the use of multiple transformers and sets of current limiting resistors for controlling test currents. Additional specifications have imposed a requirement for microprocessor control to more accurately maintain the test currents. Therefore, it has become desirable to reduce the weight and size of the meter verifier and to obtain a more accurate control of the output voltage or current than was possible with the passive control of simply selecting resistors.

It is therefore an object and feature of the present invention to provide a circuit and method of regulation which both maintain the magnitude of the output within close tolerances, while also accurately replicating the original waveform in the regulated output without introducing harmonic distortion.

A further object and feature of the invention is to provide a circuit and method which permit convenient selection of output magnitude ranges and values within those ranges and actively maintains stable regulation without introducing the inaccuracies of depending upon the selection of current limiting resistors for determining output currents.

A further object and feature of the present invention is its applicability beyond power waveforms and meter verification because of its capability of maintaining stable regulation while accurately replicating the original, input waveform regardless of whether the input waveform is sinusoidal or any other shape.

A further object and feature of the present invention is the option to remove distortion from an input waveform and convert the distorted input to a well regulated essentially pure sinusoidal output.

BRIEF DISCLOSURE OF INVENTION

In the present invention a regulated, periodic output is obtained from a periodic input by periodically sampling the input at a sampling frequency which is at least an order of magnitude greater than the frequency of the periodic input. The sampling duty ratio of the ratio of sample time duration to the sampling period is modulated as an inverse function of the magnitude of the output. The train of samples of the input is then applied to a filter to filter out the sampling frequency and its harmonics and output the resulting filtered signal. The sampling frequency and its harmonics are easily filtered out because they are so much higher in frequency than the input fundamental. In the event a non-sinusoidal input waveform is to be replicated at the output, the sampling frequency and its harmonics are easily filtered out while necessary harmonics of the input also easily pass through the filter. The regulation is accomplished by negative feedback of an output magnitude signal which is applied in a negative feedback loop to control and modulate the duty ratio and therefore maintain the stability of the output magnitude.

The method may be accomplished by using a controller circuit having a switch which is serially connected to the controller input. A magnitude detector is connected to the controller output. An oscillator having a pulse width modulated output is connected to the magnitude detector for receiving the magnitude signal which controls the width of the oscillator output pulses. The oscillator has a frequency substantially greater than the frequency of the source at the input of the controller and has its output connected to the switch for periodically switching the switch to an on state for a duration or duty ratio which is an inverse function of the magnitude of the controller output. A filter is serially interposed between the switch and the controller output and has its component values selected to reject frequencies at and above the oscillator frequency.

BRIEF DESCRIPTION OF DRAWINGS

FIGS. 9 and 10 are oscillograms illustrating the operation of the optional distortion removal feature of the present invention.

FIG. 11 is a detailed schematic diagram of the preferred embodiment of the invention. Because of the quantity of circuitry and the limitations of sheet size, FIG. 11 comprises four segments labeles FIGS. 11A-11D.

FIG. 12 is a side view showing a meter verifier connected to a meter socket and a meter under test.

Figure 1:
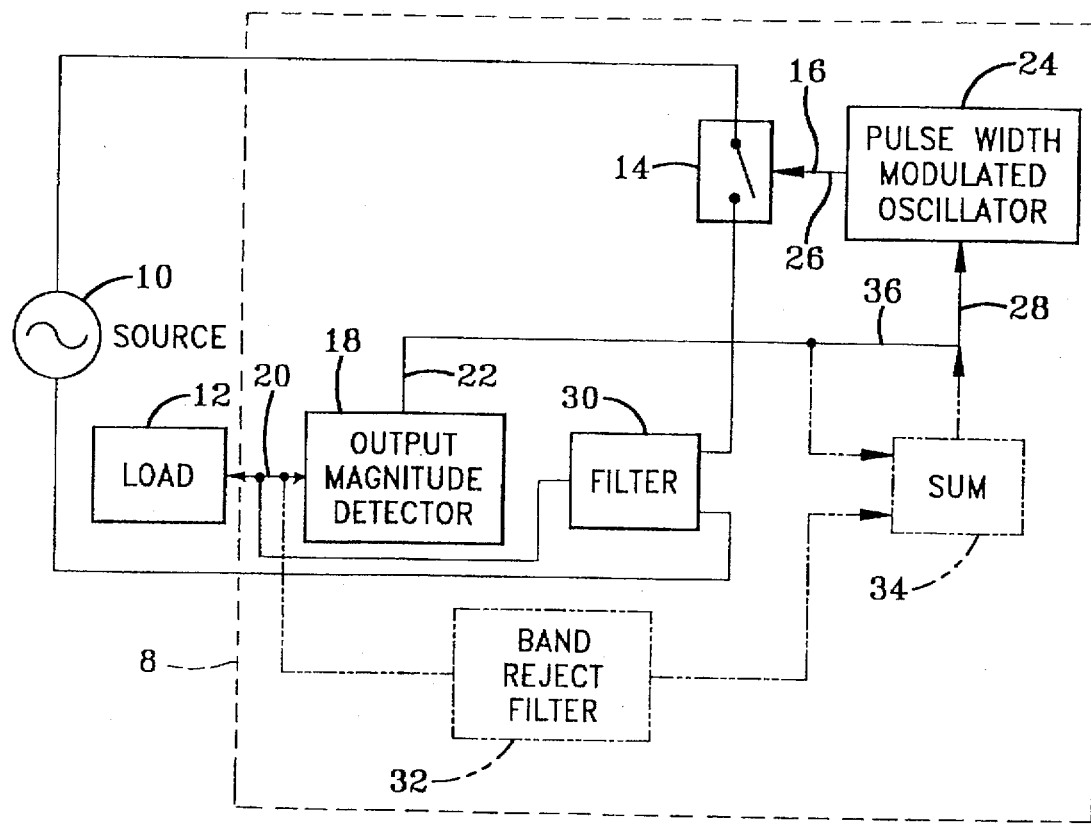
FIG. 1 is a simplified block diagram illustrating the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals. Further, those skilled in the art will recognize that, under well known principles of Boolean logic, logic levels and logic functions may be inverted to obtain identical or equivalent results.

DETAILED DESCRIPTION

FIG. 1 illustrates a controller circuit 8 embodying the present invention and shows a periodic source 10 connected to the controller's input and a load 12 connected to its output. The load 12 may, for example, be a meter under test. A switch 14 is serially connected to the controller input and has a switching control input terminal 16. The switch 14 may be any one of many kinds of transistor implemented switching devices well known to those skilled in the art. It is switched on and off by a signal applied to its control input 16.

An output magnitude detector 18 is connected to the controller output for detecting the magnitude of the voltage or current at the controller output 20. The detector 18 has a detector output terminal 22 which provides a signal which is a function of the magnitude of the controller output current or voltage. Preferably it is a linear function to provide a DC analog of the output magnitude. The detector 18 preferably detects the rectified average or RMS value of the output voltage or current, averaging it as a composite of several cycles so that the fed back magnitude signal is a DC analog representing the magnitude of the output voltage or current.

A pulse width modulated oscillator 24 is an oscillator having pulse width modulated output pulses at its output 26 which is connected to the control input terminal 16 of the switch 14. The duration and therefore the duty ratio of the modulated output pulses from the oscillator 24 is controlled by the level of the signal applied to the modulating input terminal 28 from the output of the magnitude detector 18. The output pulses from the pulse width modulated oscillator 24 periodically switch the switch 14 between its on state and its off state. Particularly, the duty ratio of the output pulses is modulated to switch the switch to its on state for a pulse duration which is an inverse function of the magnitude of the output voltage or current of the controller so that the load 12 is maintained at a constant voltage or current.

Figure 2:
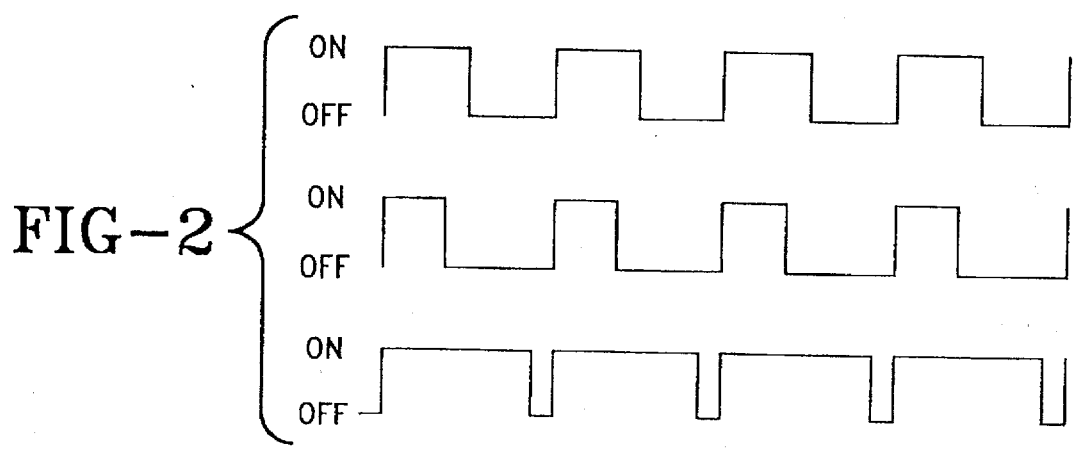
FIG. 2 is a set of oscillograms illustrating the pulse width modulated output for controlling the switch of the present invention.

The pulse width modulated oscillator 24 has a free running oscillator which oscillates between two states at a carrier frequency which is substantially higher than the frequency of the source 10. The pulse width modulated oscillator 24 preferably has an output which is a rectangular wave, such as illustrated in FIG. 2, where the ratio of the time it is in the state which switches the switch on, to its period, is the duty ratio. This duty ratio is modulated as a function of the signal at its input 28 and it will be apparent to a person of ordinary skill in the art that the circuit can be implemented in any of several alternative ways. These include digital timing, analog control through the application of a triangle or sawtooth carrier frequency signals with threshold crossover detection and other commonly applied pulse width modulation techniques for controlling the duty ratio.

Representative output pulses from the pulse width modulated oscillator 24 are illustrated in FIG. 2. The top most oscillogram of FIG. 2 illustrates the operation of the switch with a 50% duty ratio, while the intermediate oscillogram of FIG. 2 illustrates a ratio of less than 50%, and therefore of a lesser pulse duration during which the switch 14 is maintained in its on state. The lower oscillogram of FIG. 2 illustrates a 9:10 or 90% duty ratio. The present invention permits the duty ratio to vary from 0% to 100% and will typically begin at 100% under initial transient conditions before steady state equilibrium conditions are reached.

A filter 30 is serially interposed between the switch 14 and the controller output 20. The filter 30 is a low pass filter designed to reject frequencies at and above the frequency of the oscillator 24.

Although the waveform of the source 10 may be any desired waveform, if a stable sinusoidal output is desired a band reject filter 32 and summing circuit 34 may optionally be included with the circuitry, in which event the conductor segment 36 is removed so that the output of the magnitude detector 18 is applied instead to the summing circuit 34.

Figure 4:
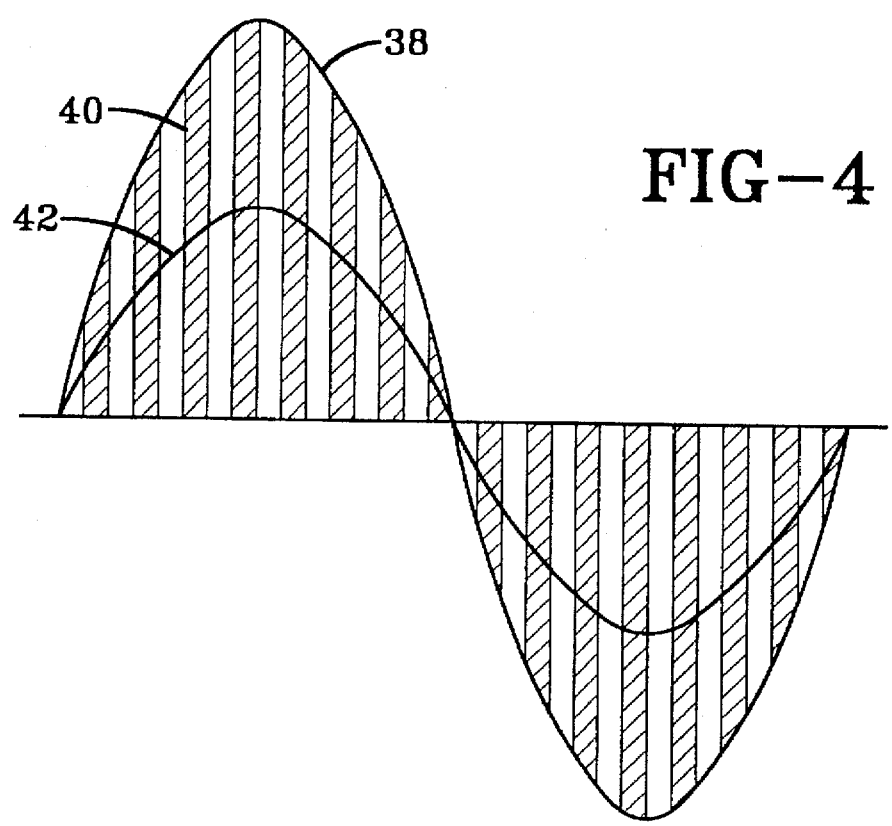
FIGS. 4-8 are oscillograms illustrating the operation of the present invention in regulating the magnitude of the output.

The operating concept of the invention is illustrated in FIG. 4. The input waveform 38 of the source 10 is effectively sampled by switching of the switch 14 to provide a train of periodic samples, such as sample pulse 40. The sampling rate or frequency is shown exaggeratedly small in FIG. 4 in order to permit illustration in a drawing. The actual sampling frequency for a 50 Hz or 60 Hz sinusoid is typically within the range of 10 KHz to 200 KHz and preferably is within the range of 20 KHz to 80 KHz. In the preferred embodiment, 20 KHz is used. The sampling frequency should be sufficiently high that it is easily filtered out so that the switching frequency and its harmonics do not pass the filter 30 while the frequency of the source waveform 38 passes relatively undisturbed through the filter. The switching frequency is limited by the limitations on the rate at which the switch can be switched and the limitation of switching losses in the switch circuit 14 which, if excessive, can cause reliability and heating problems.

The pulse samples 40 are applied to the filter 30 for filtering out the sampling frequency and the harmonics of this sampling frequency to provide an output waveform 42 which is a scaled down replica of the input waveform 38. If the input signal is not sinusoidal, for example a rectangular waveform, and replication of the input waveform at the output is desired, then it is apparent that the filter must also pass the significant lower order harmonics of the input waveform to permit its replication at the output.

Since the duty ratio of the output 26 of the pulse width modulated oscillator 24 is modulated as an inverse function of the magnitude of the output applied to the load 12, the on time of the switch 14 and therefore the pulse duration of the pulses in the train of sample pulses is similarly modulated. This provides a train of pulses of varying amplitude defined by an envelope of the input sinusoidal waveform 38 and having the duty ratio of the pulses modulated as an inverse function of the output magnitude. The output waveform 42 from the filter 30 can therefore be maintained as an accurate, stable replica of the input waveform in accordance with negative feedback control principles.

Figure 3:
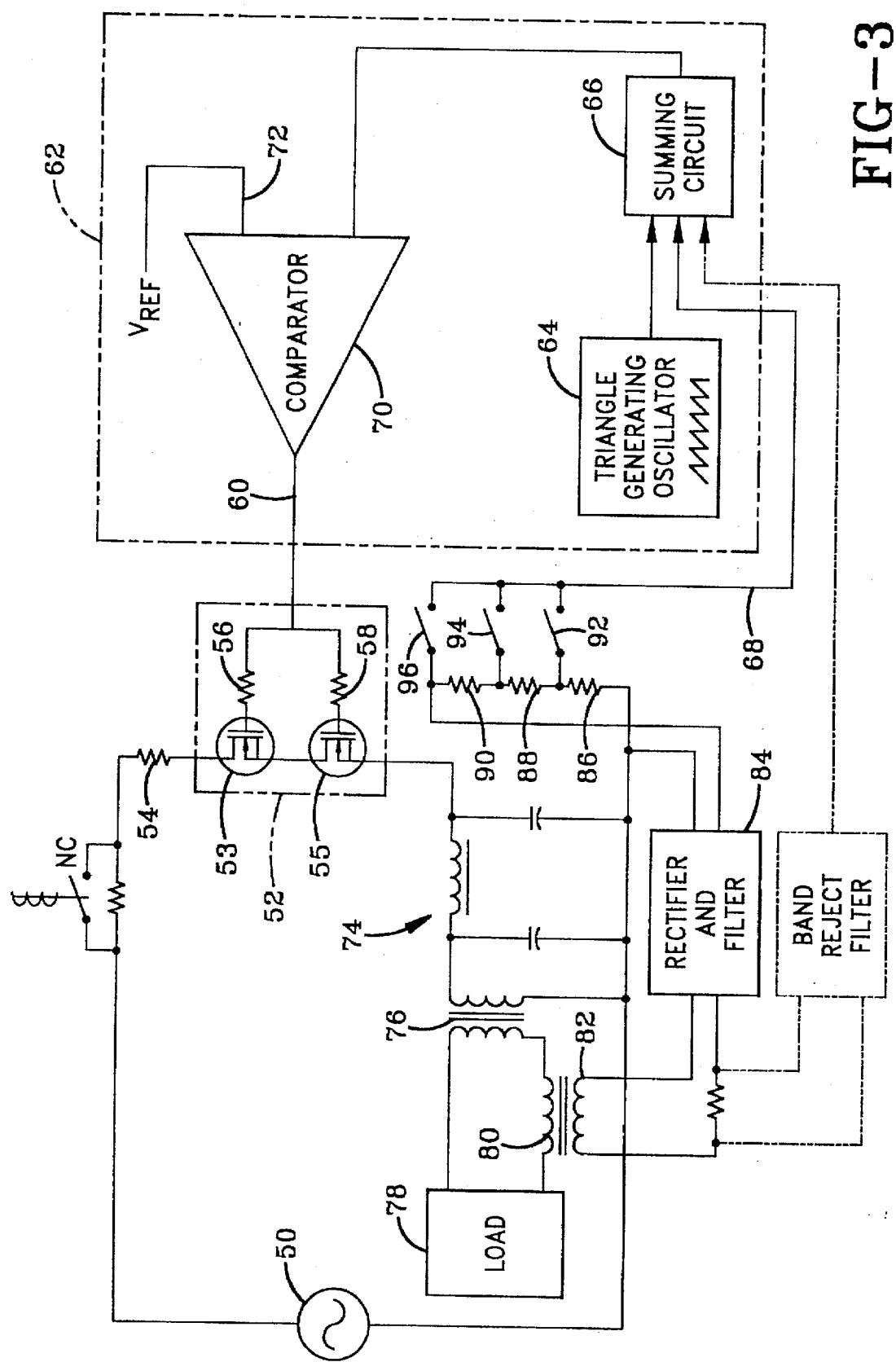
FIG. 3 is a more detailed block diagram illustrating an embodiment of the invention.

FIG. 3 is a circuit diagram in somewhat more detail illustrating additional features of the present invention. The circuit of FIG. 3 is a current regulating implementation of the invention. The source 50 is connected in series with a switch 52 through a serially interposed current limiting impedance in the form of a current limiting resistor 54. The current limiting resistor 54 provides a limit to the full load output current. The current limiting resistor 54 may be eliminated to provide a voltage implementation of the present invention.

The switch 52 comprises a pair of complementary connected, power, MOSFETs connected through gate resistors 56 and 58 to the output 60 of the pulse width modulated oscillator 62.

The pulse width modulated oscillator 62 comprises a triangle generating oscillator 64, such as a relaxation oscillator, which generates a sawtooth waveform and applies that sawtooth signal to a summing circuit 66. Also applied to the summing circuit 66 is the fed back DC analog signal representing the magnitude of the regulated output, which is applied at the modulating control input 68 to the pulse width modulated oscillator 62. The sawtooth waveform from the triangle generating oscillator 64 is summed with the signal representing the magnitude of the output current and the sum is applied to one input of a comparator 70. A reference voltage is applied to the other input 72.

A pi filter 74 filters out the oscillator carrier or sampling frequency and its harmonics and applies its output to a current transformer 76. The load 78 is series connected through a current sensing transformer 80 to the secondary of the current transformer 76. The current sensing transformer 80 has a secondary winding 82 which recovers a signal from which the magnitude of the output current through load 78 is detected by a full wave rectifier and filter 84. The output from the rectifier and filter 84 is applied to an attenuator circuit formed, for example, by three resistors 86, 88, and 90 with alternatively selectable taps which are selected by switching on one of the switches 92, 94, and 96. This attenuator permits the fed back voltage to be scaled to one of three alternatively selectable values in order to permit selection of one of three regulated, output, current ranges.

Figure 6:
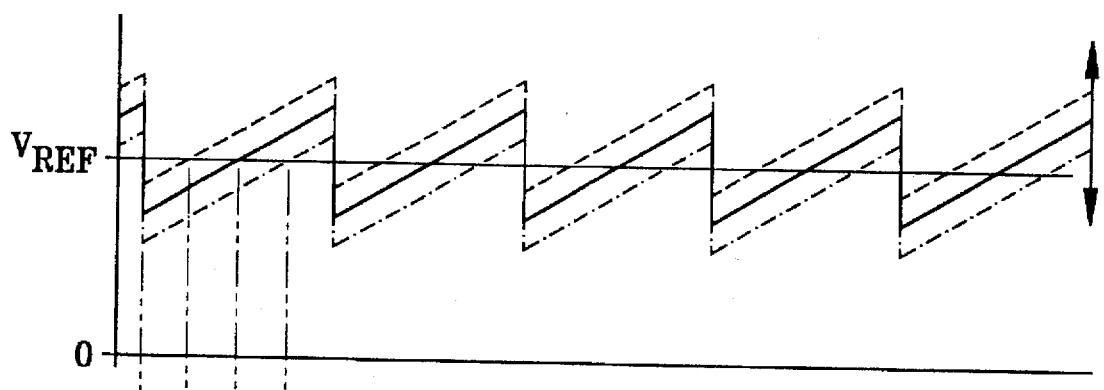
Figure 7:
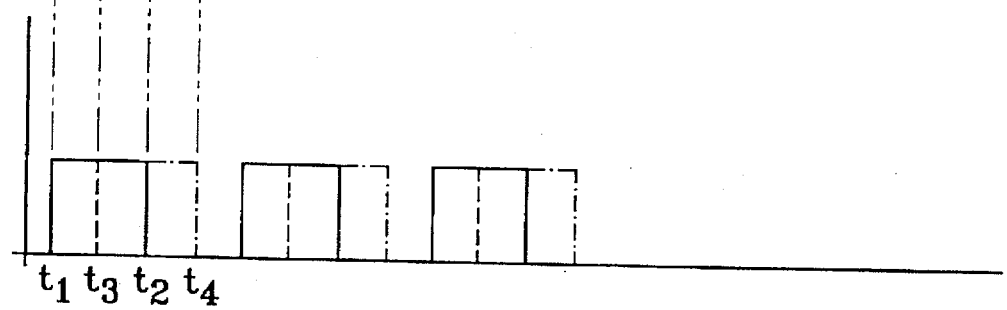
Figure 8:
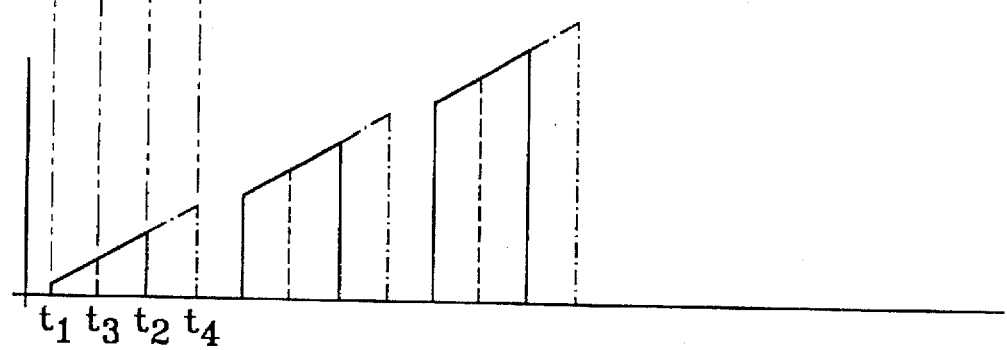
Figure 11A:
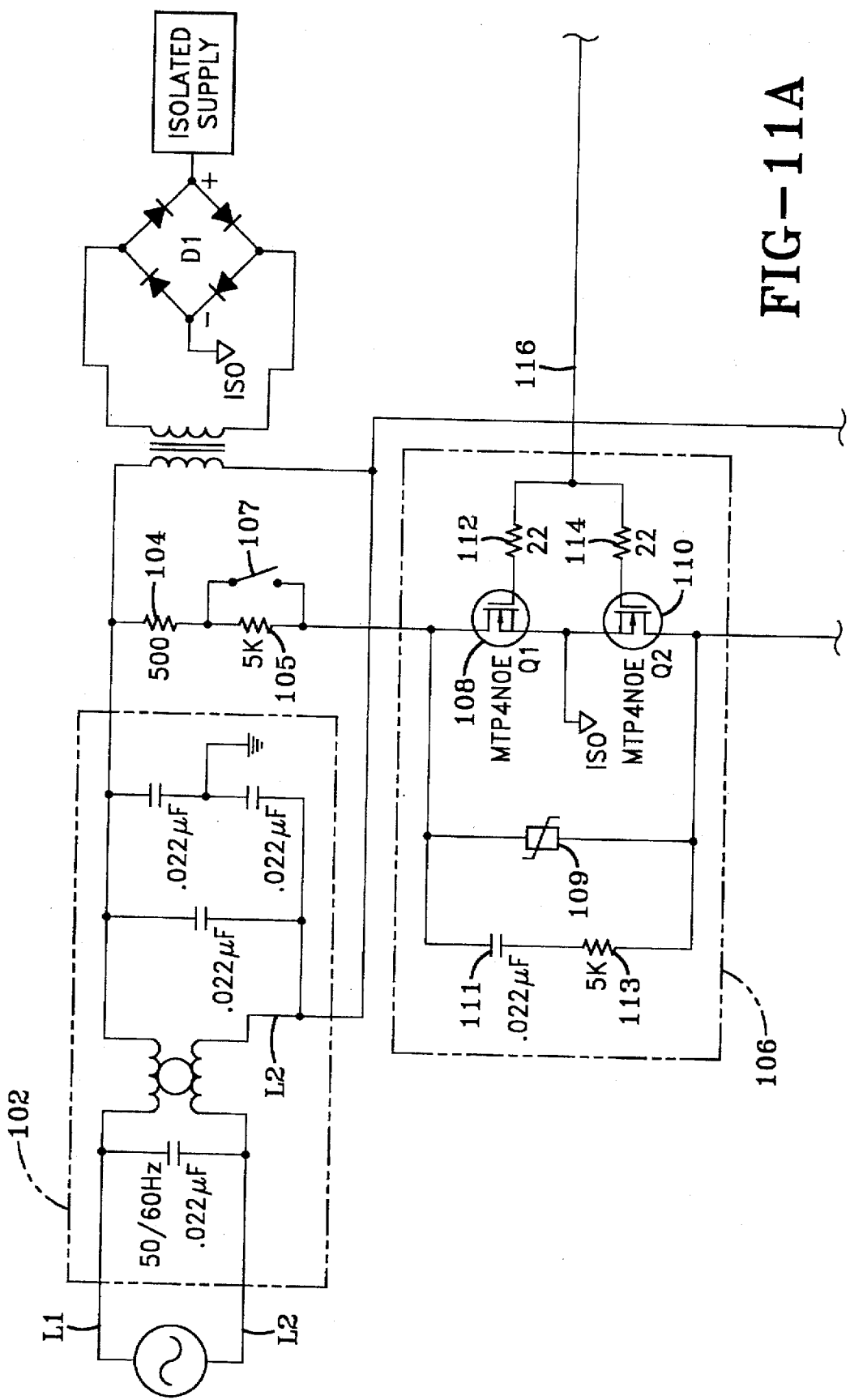
FIGS. 11A-11D comprises four segments of the diagram of FIG. 11.
Figure 11B:
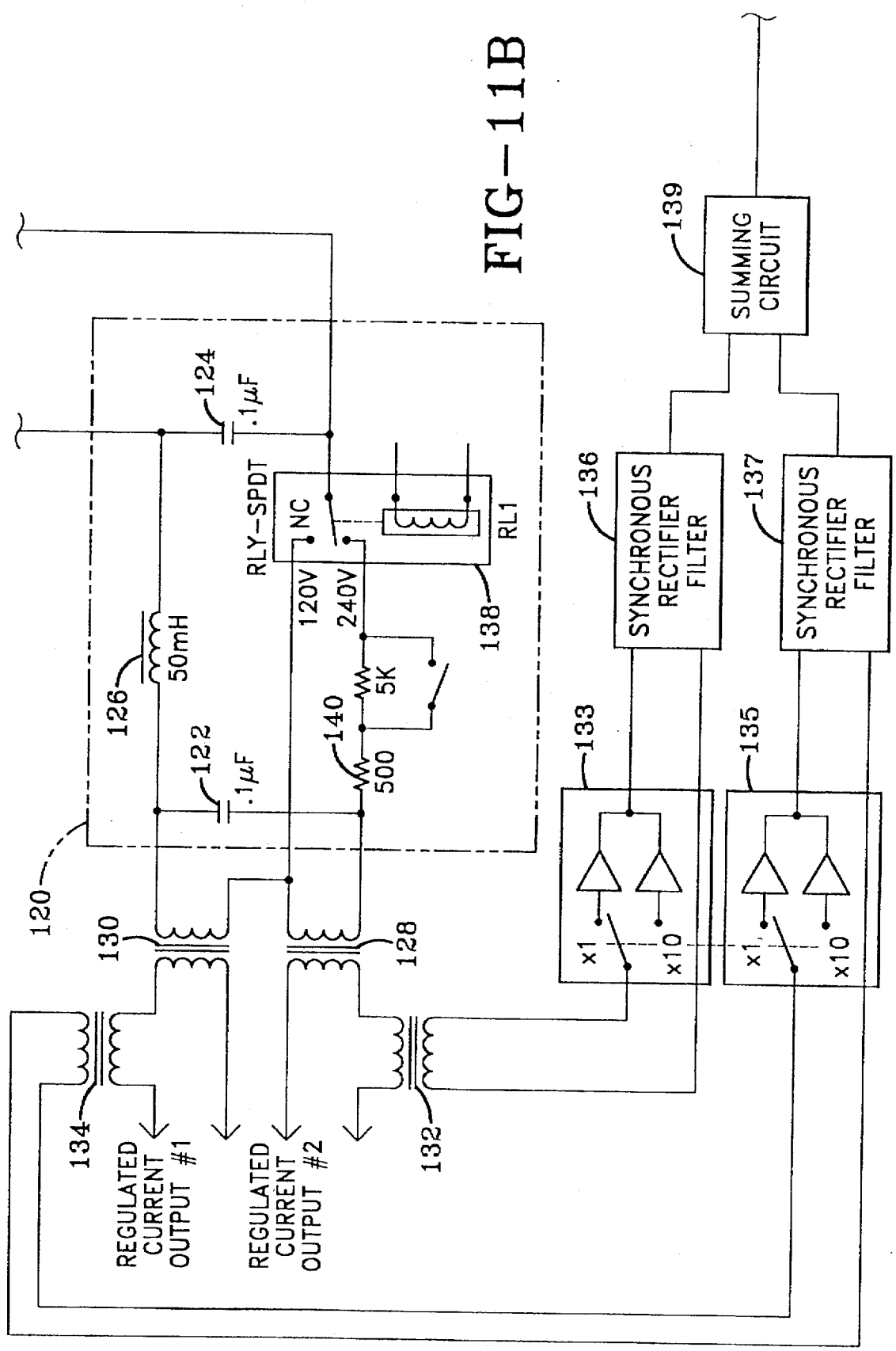
Figure 11C:
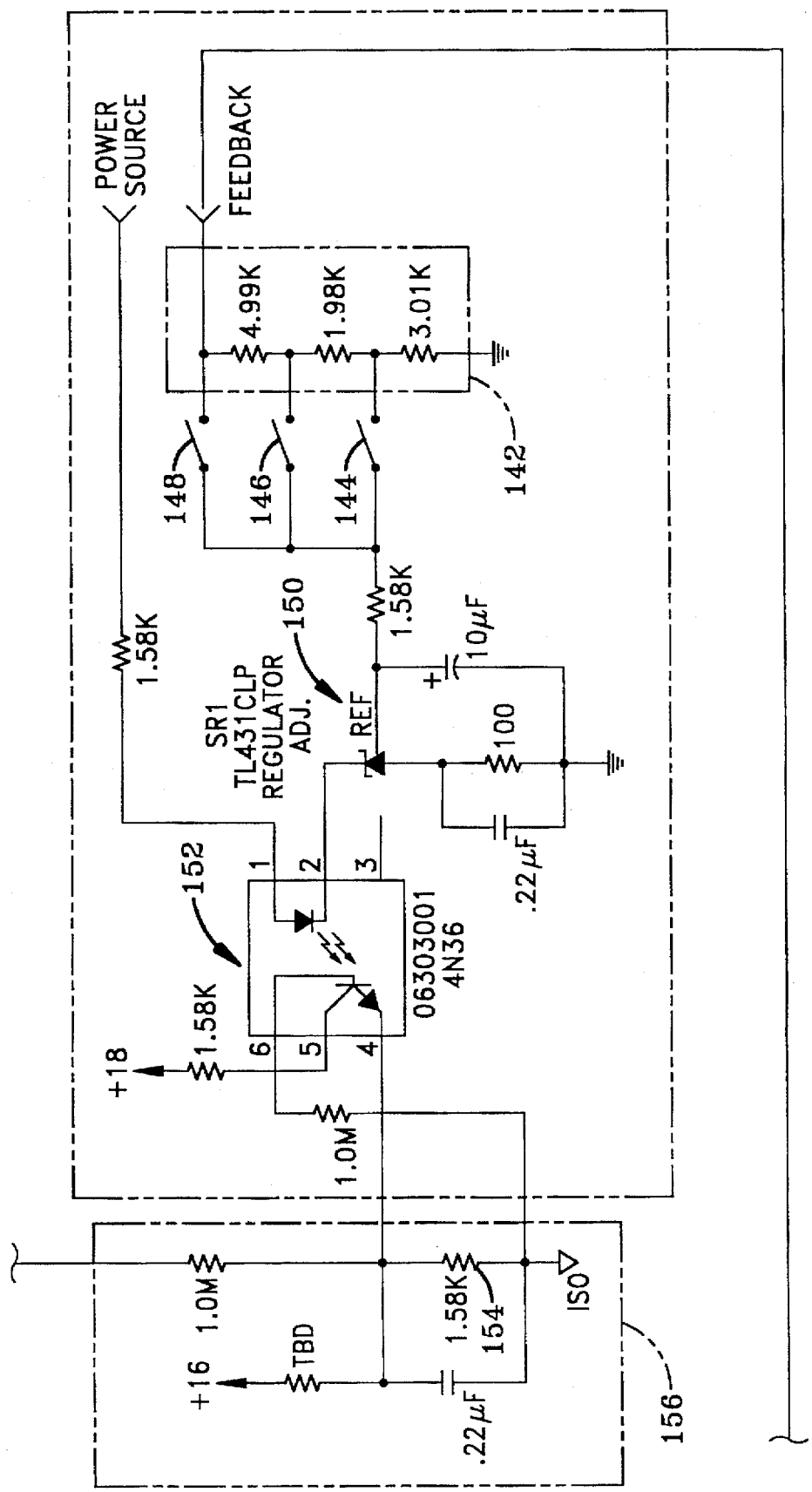
Figure 11D:
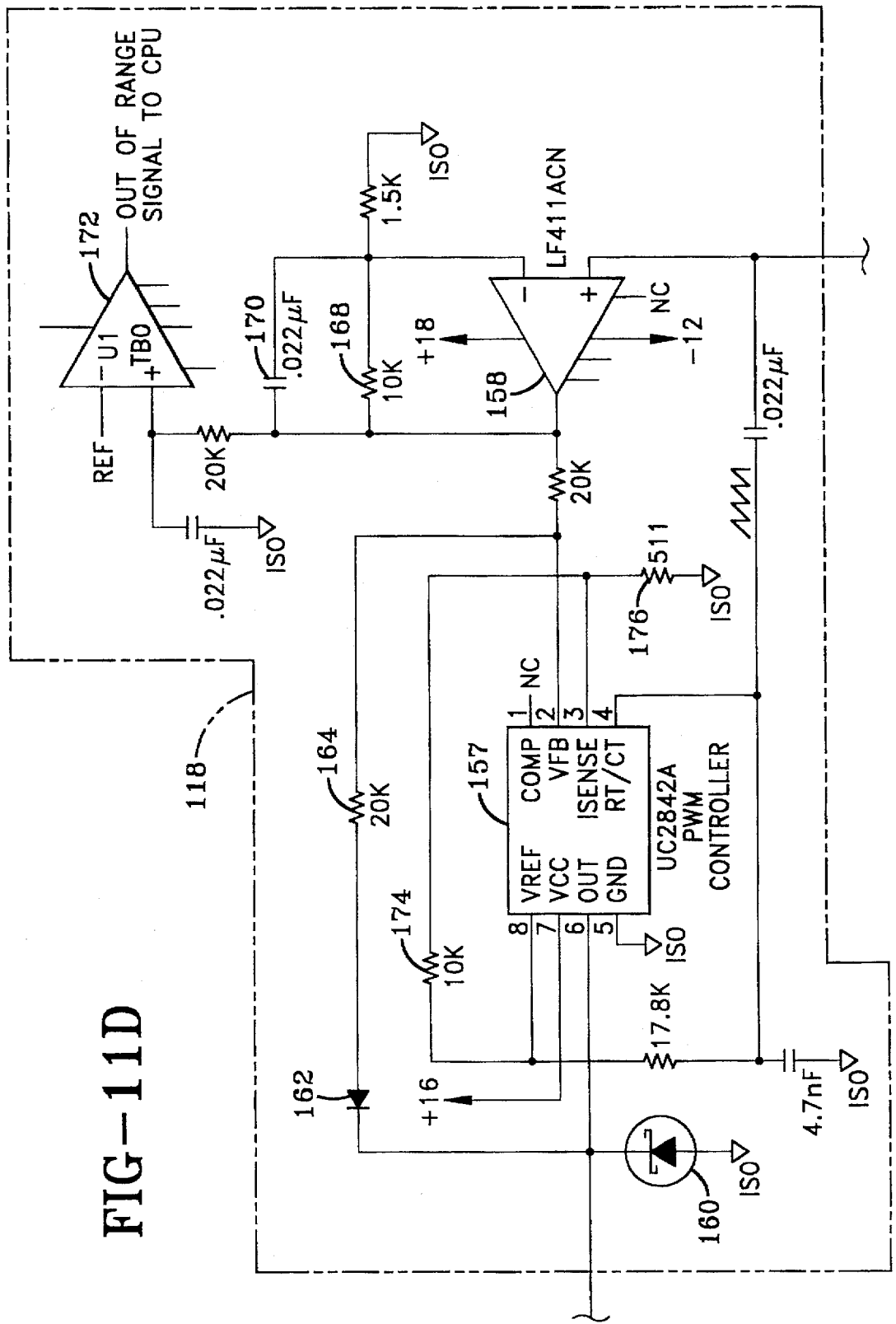

FIGS. 6, 7 and 8 illustrate the operation of the embodiments of the invention. In FIG. 6 the solid line sawtooth waveform represents the sum of the output of the triangle generating oscillator 64 and the fed back signal at input 68 representing the magnitude of the output current to the load 78. With the sawtooth waveform superimposed upon the DC analog magnitude signal, the sawtooth rides up and down on the magnitude signal. Thus, the average value of the sawtooth waveform is raised above the zero horizontal reference line by a voltage amount equal to the fed back DC analog magnitude signal at input 68. Consequently, variations in the output current will raise and lower the position of the sawtooth illustrated in FIG. 6 in a manner illustrated in dashed and phantom lines.

The comparator 70 compares the reference input voltage at its input terminal 72 to the output voltage of the summing circuit 66. When the reference voltage exceeds the superimposed sum of the fed back magnitude signal and the sawtooth voltage, the comparator shifts its output state to switch on the complementary MOSFET transistors 53 and 55. When the sum of the sawtooth and the fed back magnitude voltage exceeds the reference voltage, the comparator shifts its output state to switch off MOSFET transistors 53 and 55.

FIG. 7 illustrates the switching of the output 60 from the comparator 70 and FIG. 8 illustrates a short segment of the switched source signal as applied to the filter 74.

In operation, under transient conditions which exist immediately following energization of the circuit, the output current will begin at zero and will increase toward a steady state value. Initially, therefore, the sawtooth waveform will be entirely below the reference voltage illustrated in FIG. 6, and therefore the switch 52 will be constantly maintained in its on state while the output current increases. When the circuit reaches an equilibrium, steady state condition, the switch 52 will be switched on when the sawtooth descends below the reference voltage and will be switched off when the sawtooth ascends above the reference voltage. Therefore, with respect to the solid lines of FIGS. 6–8, the switch 52 will be switched on at time $t_1$ and switched off at time $t_2$.

In the event that the output current decreases, the sawtooth will be lowered with respect to the reference voltage as a result of a decrease in the fed back magnitude signal. Consequently, the ascending cross-over of the sawtooth with the reference voltage will occur at a later time $t_4$. This results in an increased duty ratio and increased sample duration and therefore an increased RMS output. Similarly, an increase in output current will result in a rise of the sawtooth with respect to the reference voltage and a consequent turning off of the switch 52 as a result of the ascending sawtooth voltage crossing over the reference voltage at time $t_3$. That in turn results in a switching off of the switch 52 at an earlier time $t_3$ and therefore in a decreased sampling duration and duty ratio and a consequent decreased RMS voltage applied to the filter 74.

Therefore, it can be seen that the output current is maintained at a stable value because increases in output current result in decreased sample duration time or duty ratio and therefore a decrease in RMS voltage or current applied to the filter tending to decrease the output current in accordance with feedback control principles to maintain an output equilibrium value within close tolerances so long as there is a sufficiently high gain in the circuit, as is well known in the feedback control art.

The detailed circuit diagram for the preferred embodiment of the invention is illustrated in FIG. 11. This circuit alternatively produces two tracking regulated sets of test currents, or a single test current. It provides full load regulated currents at 15, 30, and 50 amperes and light load regulated currents at 1.5, 3, and 5 amperes. In FIG. 11, groups of circuit components are enclosed in dashed lines to represent the component blocks of the preferred circuit.

A source voltage is delivered by the utility at inputs $L_1$ and $L_2$ from a single phase 120 volt power source or a single phase 3 wire 240 volt power source. The input is applied to a conventional electromagnetic interference filter 102. The input voltage is applied through a current limiting resistor 104 to a controlled switch 106. A second, series connected current limiting resistor 105 can also be switched into the circuit by opening the switch 107 of a solid state relay. Opening the switch 107 increases the total series current limiting resistance to provide a light load current.

The controlled switch 106 comprises a pair of complimentary connected MOSFETs 108 and 110. The MOSFETs 108 and 110 are connected through gate resistors 112 and 114 to the output 116 of the pulse width modulated oscillator 118. The circuit of switch 106 also includes a metal oxide varistor 109 and a snubber circuit consisting of a capacitor 111 and a resistor 113 for transient protection and RFI reduction.

The current through the switch 106 is applied to a filter 120 which consists of capacitors 122 and 124 and inductor 126 formed into a conventional pi filter. A pair of current transformers 128 and 130 are connected to the output of the filter 120 for providing a pair of regulated output currents. Each of two different current sensing transformers 132 and 134 have a primary serially connected to a different one of the current transformers 128 and 130 for deriving at their secondary a signal which is proportional to the respective output currents in their primaries. The secondaries of the current sensing transformers 132 and 134 are connected respectively through switchable gain amplifiers 133 and 135 to synchronous rectifier and filter circuits 136 and 137 for converting their AC outputs to DC analog signals which are proportional to the average magnitude of the output currents. Each switchable gain amplifier multiplies the feedback signal by 10 during light load operation and by 1 during full load operations. Each is switched by the controlling CPU or alternatively by a manual switch. The outputs from the rectifier/filter circuits 136 and 137 are applied to a summing circuit 139 for obtaining a signal representing the mean value of the two detected output currents.

A single pole, double throw relay switch 138 alternatively connects to L2 either the primary of current transformer 130 or connects to L the primary of current transformer 128 through a 500 ohm current limiting resistor 140. With this circuit configuration, current is supplied only by the transformer 30 when its primary is connected to L2' by relay switch 138. This is appropriate for supplying a test current to a type 1S meter used for a single phase 120 volt power line feed. Alternatively, when the primary of current transformer 128 is connected to L2' by the relay switch 138, the current limiting resistor 140 and the primary of transformer 128 are switched in series with the primary of transformer 130 so that both transformers supply identical, tracking currents. This position is appropriate for supplying test current to a 2S meter used for metering a single phase three wire 240 volt power line feed. A second 5k resistor is switchable into series connection with the resistor 140 in synchronism with the resistor 105 when the series limiting resistors are switched to supply a light load current.

A variety of other output configurations are possible. For example, the output can consist of a single current transformer connected to the output of the filter 120. Alternatively, two or more transformers may be permanently connected in series. For providing a regulated voltage output, the transformers may be eliminated and a well known voltage detector circuit may be substituted, as will be apparent to those skilled in the art, for deriving a DC analog output for feeding back and representing the output voltage. Of course, transformers may be used in both the current and voltage modes for scaling. Another output transformer and switching arrangement can use one transformer for full load output and a second transformer for light load output.

The analog feedback signal is applied to a resistive voltage divider array 142 with alternatively selectable taps which are selected by switches 144, 146 and 148. Thus, the proportion of the feedback signal which is fed back is selected by these switches to determine the output current. Closing only the switch 144 selects a 50 amp full load current and 5 amp light load current. Closing only the switch 146 selects 30 amps and 3 amps and closing only the switch 148 selects 15 amps and 1.5 amps as the full and light load currents. The selected output is applied to an adjustable regulator circuit 150 which also constitutes the primary reference for establishing regulation. The output current of the adjustable regulator circuit 150 is then applied to an optical isolator circuit 152 and by it to resistor 154 of a summing circuit 156.

The pulse width modulated oscillator 118 of the preferred circuit utilizes a commercially available, Unitrode current mode PWM controller UC2842A integrated circuit. However, this chip is not used in this circuit as a current mode controller and therefore some of the features are disabled so as not to interfere with the operation of the present invention. The integrated circuit 157 provides a sawtooth output at its pin 4 which is applied to the summing circuit 156. In this manner the sum of the fed back signal and the sawtooth is applied to amplifier 158. The amplifier 158 scales the fed back sum signal and drives the integrated circuit 157.

The integrated circuit 157 operates substantially in the manner illustrated in FIGS. 6–8 except that it contains an oscillator having a clock output pulse which is applied to logic circuitry for switching its output terminal 6 to a state which turns on the MOSFETs 108 and 110 upon occurrence of each clock pulse. An internal voltage reference is applied to a comparator within the integrated circuit 157. The integrated circuit 157 switches its output at pin 6 to turn off the MOSFETs 108 and 110 when the superimposed feedback signal and sawtooth signal applied to pin 2 exceeds the internal reference voltage.

The preferred circuit of FIG. 11 also includes conventional enhancements which do not form a part of the present invention. For example, a Schottky diode 160 is connected at the output pin 6 of integrated circuit 157 to protect the chip. A blanking circuit formed by diode 162 and resistor 164 assures that a control cycle has terminated. When the output goes low, the low output is fed back to the input to crow bar the input and hold the integrated circuit output at the terminated condition. Resistor 168 and capacitor 170 in the feedback loop of the amplifier 158 determine the gain of the amplifier. The amplifier 172 develops a signal for feeding back to the central processing unit, not shown. Resistors 174 and 176 are provided to hold and render ineffective features of the integrated circuit which are not used.

As will be apparent to those skilled in the art, a variety of other pulse width modulating techniques may be utilized to accomplish the method and construct embodiments of the present invention. For example, the modulating technique illustrated in my previous U.S. Pat. No. 3,794,917 may be adapted for alternative use in embodiments of the invention. Other pulse width modulating techniques may also be utilized.

Therefore, it can be seen from the above description that the present invention samples the input signal at a high frequency which is well above the frequency of the input signal so that the sampling or carrier frequency may be easily filtered out. The sampling duty ratio is pulse width modulated as an inverse function of the detected magnitude of the output. The inverse function, preferably inversely proportional, provides the negative feedback so that when the output increases the circuit works to decrease the output according to common negative feedback control principles in order to maintain an output equilibrium within close tolerances. The control of the switch can also be accomplished by a computer having a suitable A/D converter connected to the output magnitude detector and an output driver for adapting the digital outputs and driving the switch.

Because a small duty ratio would result in poor regulation by reducing the conduction angle to a very small angle, light load currents are instead obtained by varying the current limiting resistance so that a greater conduction angle is maintained at light load conditions. However, instead of varying the current limiting resistance continuously over a range, it is preferred to switch current limiting resistors, such as resistor 105, in and out of the circuit to accomplish the variation of the current limiting resistor. In this manner full and light loads are obtained by switching the current limiting resistance and the three different current output levels of 15, 30 and 50 amperes are obtained by switching the proportion of the fed back magnitude signal in the attenuator 142.

For some applications, an appropriate enhancement can be added to the circuit for compensating for any distortion in a sinusoidal input to the circuit. For this purpose a band rejecting filter 32 which is designed to reject the fundamental frequency of the input source 10 in FIG. 1, provides an output signal which represents the sum of all distortion harmonics. This distortion signal is summed with the fed back analog magnitude signal. This super imposition of the distortion signal causes the triangle waveform illustrated in FIG. 6 to ride up and down within each cycle in response to change in the distortion signal.

Figure 5:
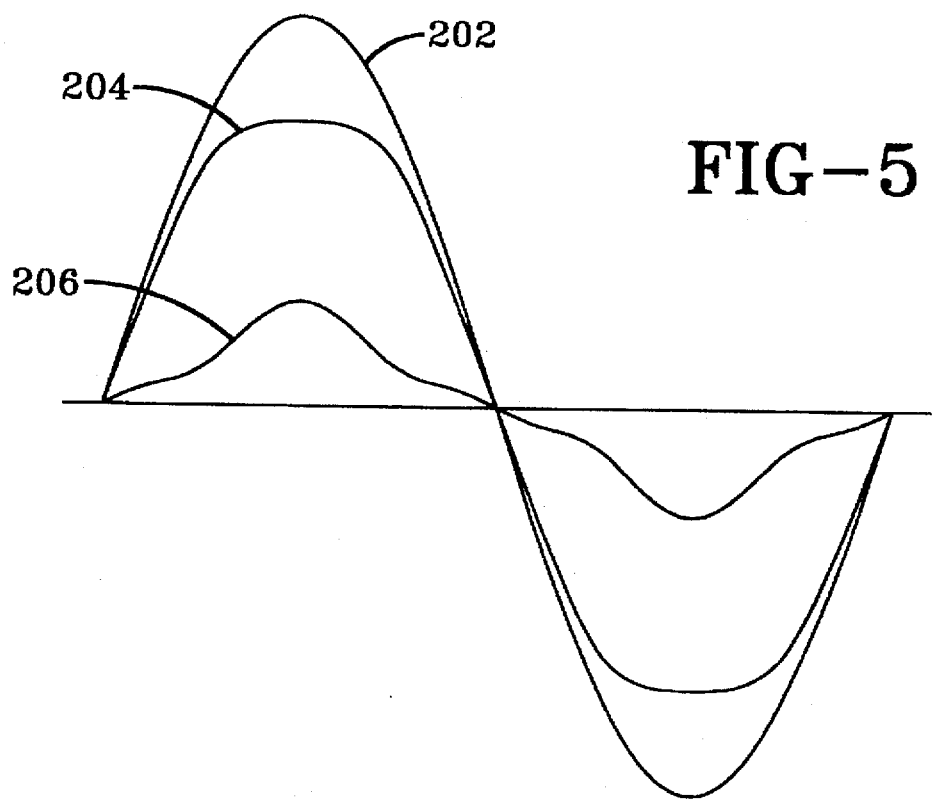

FIG. 5 illustrates an ideal sinusoid 202 and an actual distorted sinusoid 204. The difference between the two is the distortion represented as distortion signal 206. The distortion signal causes the triangle wave 208 of FIG. 9 to ride upwardly and downwardly within each cycle upon the distortion signal, thereby modulating the pulse width and duty ratio in proportion to the distortion.

FIGS. 9 and 10 illustrate a small portion of a cycle in which the triangle waveform rides upwardly in proportion to the distortion so that its ascending cross-over with the reference voltage occurs increasingly earlier, thereby terminating the on interval of the switch 14 at an increasingly earlier time. In this manner the duty ratio is additionally modulated within each cycle by the distortion signal to compensate for and thereby remove the distortion, resulting in an output signal without significant distortion.

FIG. 12 shows a meter socket 300 with a meter verifier comprising an adapter 302 into which the meter 304 is connected. The control unit 306 of the verifier is connected to the adapter 302 by a cable 208.

While certain preferred embodiments of the present invention have been disclosed in detail, it is to be understood that various modifications may be adopted without departing from the spirit of the invention or scope of the following claims.

I claim:

1. A controller circuit for providing, at a controller output, a periodic output waveform having a regulated magnitude derived from a periodic source connected to a controller input, the controller circuit providing line and load regulation compensating for line and load variations, the circuit comprising:

(a) a switch having an input connected to the controller input, an output and a switching control input;

(b) a magnitude detector having an input connected to the controller output, a detector output, and means for developing a detector output signal which is a function of the magnitude of the AC output waveform, the detector output signal provided at the detector output;

(c) a pulse width modulated oscillator having an input coupled to the detector output, means for developing an oscillator frequency greater than the frequency of the periodic source, an output, and means for developing an output pulse signal having a frequency greater than the frequency of the periodic source and having a width which is modulated proportional to the signal at the oscillator input, the output pulse signal produced at the output of the oscillator, the oscillator output connected to the switching control input of the switch for periodically switching the switch between its on and off states at a duty ratio which is an inverse function of the magnitude of the controller output; and (d) a low pass filter having an input coupled to the output of the switch and an output coupled to the controller output and adapted to reject frequencies at and above the oscillator frequency and produce at the filter output a resulting filtered signal at the frequency of the periodic input.

2. An apparatus in accordance with claim 1 wherein a current limiting impedance is also serially interposed with the switch and filter between the input and output of the controller.

3. An apparatus in accordance with claim 2 wherein the current limiting impedance is a variable impedance which is variable to a plurality of selected impedance values for selecting an output magnitude range.

4. An apparatus in accordance with claim 3 wherein a variable attenuator is interposed between the detector and the modulating input terminal for selecting an output magnitude.

5. An apparatus in accordance with claim 4 wherein said impedances are resistors.

6. An apparatus in accordance with claim 4 wherein said switch comprises a pair of serially connected, complementary, power, MOSFET transistors.

7. An apparatus in accordance with claim 4 wherein the pulse width modulated oscillator comprises:

(a) a free running oscillator coupled through a gate to the switch for initiating a sampling interval;

(b) a triangle wave signal generator;

(c) a summing circuit connected to the triangle wave generator and to the output of the magnitude detector for deriving the sum of the triangle wave signal and a signal representing the magnitude of the output; and (d) a comparator connected to receive the output of the summing circuit for comparing the sum to a reference level, the comparator output connected to the gate for terminating the sampling interval.

8. An apparatus in accordance with claim 4 wherein: a current transformer is interposed between the filter and the controller output; and wherein the magnitude detector comprises a current sensing transformer having a primary serially interposed between the current transformer and the controller output and a rectifier and filter connected between the secondary of the current transformer and the modulating input terminal of the oscillator.

9. An apparatus in accordance with claim 1 wherein a variable attenuator is interposed between the detector and the modulating input terminal for selecting an output magnitude.

10. An apparatus in accordance with claim 1 wherein a current transformer is interposed between the filter and the controller output; and wherein the magnitude detector comprises a current sensing transformer having a primary serially interposed between the current transformer and the controller output and a rectifier and filter connected between the secondary of the current transformer and the modulating input terminal of the oscillator.

11. An apparatus in accordance with claim 10 and having a plurality of outputs, wherein a plurality of current transformers have primary windings which are serially connected together and are interposed between the filter and the controller output terminals, and wherein the magnitude detector comprises a plurality of current sensing transformers each having a primary serially interposed between a different one of the current transformers and a controller output and having a rectifier and filter connected between the secondaries of the current transformers and the modulating input terminal of the oscillator.

12. A controller in accordance with claim 1 and further comprising a meter connector electrically connected to the controller output for verifying the accuracy of the meter.

13. A controller in accordance with claim 1 and further including a distortion compensation circuit comprising: a band rejecting filter connected to the controller output and a summing circuit connected to sum the output of the magnitude detector and the output of the band rejecting filter and connected to apply the sum to said modulating input terminal.

14. A method for providing a regulated periodic output from a periodic input, the method providing line and lead regulation compensating for line and load variations, the method comprising:

(a) sampling the input at a sampling frequency at least 10 times the frequency of the period input while modulating the duty ratio of the samples as an inverse function of the magnitude of the output; and (b) filtering out the sampling frequency and harmonics of the sampling frequency from the sampled input, and providing the resulting filtered signal at the frequency of the periodic input.

15. A method in accordance with claim 14 and further comprising varying the resistance of a current limiting resistor serially interposed between the input and output terminals of the controller for selecting an output magnitude.

16. A method in accordance with claim 14 and further comprising detecting the magnitude of the output and feeding back a signal proportional to the output magnitude for controlling the sampling pulse duration.

17. A method in accordance with claim 16 and further comprising varying the magnitude of the fed back signal for controlling the magnitude of the output.

18. A method in accordance with claim 14 and further comprising applying the regulated output to a meter for verifying the accuracy of the meter.

19. A method in accordance with claim 14 and further including filtering out the fundamental frequency of the regulated periodic output to derive a distortion signal and modulating the sampling duty ratio as an inverse function of the distortion signal.

20. A controller for providing a regulated periodic output waveform at a controller output derived from a periodic source connected to a controller input, the controller providing line and load regulation compensating for line and load variations, the controller comprising:

(a) detector means having an output and having an input connected to the controller output for detecting the magnitude of the output waveform;

(b) pulse width modulated sampling means having an input connected to the controller input, having a sample control input connected to the output of the detecting means, and means for sampling the periodic source at a sampling frequency which exceeds the frequency of the periodic source while modulating the duty ratio of the samples as an inverse function of the output waveform magnitude; and (c) low-pass filter means having an input coupled to the sampling means and an output coupled to the controller output for filtering out the sampling frequency and harmonics of the sampling frequency and providing the resulting filtered signal at the frequency of the periodic input.

21. A controller in accordance with claim 20 wherein the sampling means is an oscillator having a pulse width modulated output controlling a switch interposed between the controller input terminals and the filter means.

22. A controller in accordance with claim 21 wherein a current limiting impedance is also serially interposed with the switch and filter means between the input and output of the controller.

23. A controller in accordance with claim 22 wherein the current limiting impedance is a variable impedance which is variable to a plurality of selected impedance values for selecting an output magnitude range.

24. A controller in accordance with claim 23 wherein a variable attenuator is interposed between the detector means and the sampling means for selecting an output magnitude.

25. An controller in accordance with claim 20 wherein a variable attenuator is interposed between the detector means and the sampling means for selecting an output magnitude.

26. A controller in accordance with claim 25 and further comprising a meter connector electrically connected to the controller output for verifying the accuracy of the meter.

27. A controller in accordance with claim 20 and further comprising a meter connector electrically connected to the controller output for verifying the accuracy of the meter.

28. A controller in accordance with claim 20 and further including a distortion compensation circuit comprising: a band rejecting filter connected to the controller output and a summing circuit connected to sum the output of the magnitude detector and the output of the band rejecting filter and connected to apply the sum to said input of the modulated sampling means.

* * * * *